United States Patent
Sweeney (10) Patent No.: US 11,580,694 B1
(45) Date of Patent: Feb. 14, 2023

(54) PASSIVE WIDE-AREA THREE-DIMENSIONAL IMAGING

(71) Applicant: Massachusetts Institute of Technology, Cambridge, MA (US)

(72) Inventor: Robert Sweeney, Billerica, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 386 days.

(21) Appl. No.: 17/005,410

(22) Filed: Aug. 28, 2020

Related U.S. Application Data (60) Provisional application No. 62/926,949, filed on Oct. 28, 2019.

(51) Int. Cl.
  *G06K 7/10* (2006.01)
  *G06T 17/05* (2011.01)

(52) U.S. Cl.
  CPC .................. *G06T 17/05* (2013.01)

(58) Field of Classification Search
  CPC ..... G06T 11/206; G06T 7/0012; G06T 15/00; G06T 7/0036; G06T 1/00; G06K 9/00624; G06K 9/6218; G06K 9/6255; G06K 9/00718; G06K 9/6267; H04N 7/181
  USPC ................................................ 382/154, 103
  See application file for complete search history.

(56) References Cited

U.S. PATENT DOCUMENTS

| | | | |
|---|---|---|---|
| 6,150,972 A | 11/2000 | Bickel et al. | |
| 2015/0036916 A1 | 2/2015 | Mundhenk et al. | |
| 2015/0131886 A1* | 5/2015 | Aben | G06T 7/32 |
| | | | 382/132 |
| 2018/0160080 A1* | 6/2018 | Coulter | H04N 7/181 |

OTHER PUBLICATIONS

Baker et al., "Lucas-kanade 20 years on: A unifying framework." International Journal of Computer Vision 56.3 (2004): 221-255.
Clasen et al., "Analysis of LiDAR data for emergency management and disaster response." Optical Remote Sensing of the Environment. Optical Society of America, 2012. 4 pages.
Clifton et al., "Medium altitude airborne Geiger-mode mapping LIDAR system." Laser Radar Technology and Applications XX; and Atmospheric Propagation XII. vol. 9465. International Society for Optics and Photonics, 2015. 9 pages.

(Continued)

*Primary Examiner* — Phuoc H Doan
(74) *Attorney, Agent, or Firm* — Smith Baluch LLP (57) ABSTRACT

Radar, lidar, and other active 3D imaging techniques require large, heavy sensors that consume lots of power. Passive 3D imaging techniques based on feature matching are computationally expensive and limited by the quality of the feature matching. Fortunately, there is a robust, computationally inexpensive way to generate 3D images from full-motion video acquired from a platform that moves relative to the scene. The full-motion video frames are registered to each other and mapped to the scene coordinates using data about the trajectory of the platform with respect to the scene. The time derivative of the registered frames equals the product of the height map of the scene, the projected angular velocity of the platform, and the spatial gradient of the registered frames. This relationship can be solved in (near) real time to produce the height map of the scene from the full-motion video and the trajectory.

20 Claims, 7 Drawing Sheets

(56) References Cited

OTHER PUBLICATIONS

Hodgson et al., "An evaluation of LIDAR-and IFSAR-derived digital elevation models in leaf-on conditions with USGS Level 1 and Level 2 DEMs." Remote Sensing of Environment 84.2 (2003): 295-308.
Jarihani et al., "Satellite-derived Digital Elevation Model (DEM) selection, preparation and correction for hydrodynamic modelling in large, low-gradient and data-sparse catchments." Journal of Hydrology 524 (2015): 489-506.
Özyeşil et al., "A survey of structure from motion*." Acta Numerica 26 (2017): 305-364.
Schonberger et al., "Structure-from-motion revisited." Proceedings of the IEEE Conference on Computer Vision and Pattern Recognition. 2016. 10 pages.
Snavely et al., "Modeling the world from internet photo collections." International Journal of Computer Vision 80.2 (2008): 189-210.
International Search Report and Written Opinion in International Patent Application No. PCT/US2020/048334 dated Jul. 14, 2021, 12 pages.
Zhang et al., "Exploiting temporal consistency for real-time video depth estimation." Proceedings of the IEEE/CVF International Conference on Computer Vision. 2019. 10 pages.

\* cited by examiner

PASSIVE WIDE-AREA THREE-DIMENSIONAL IMAGING

CROSS-REFERENCE TO RELATED APPLICATIONS

This application claims the priority benefit, under 35 U.S.C. 119(e), of U.S. Application No. 62/926,949, filed on Oct. 28, 2019, the entire disclosure of which is incorporated herein by reference.

GOVERNMENT SUPPORT

This invention was made with Government support under Grant No. FA8702-15-D-0001 awarded by the U.S. Air Force. The Government has certain rights in the invention.

BACKGROUND

Radar, lidar, and passive imaging techniques based on feature-matching have each been used to create three-dimensional (3D) images. A radar uses radio-frequency (RF) radar signals to measure the distance to a target or scene. The radar transmits a pulsed radar signal toward the target, which reflects or scatters the incident RF radiation toward the radar's receive aperture. The radar determines the range to the target based on the time delay between transmitting the pulsed radar signal and detecting the back-scattered RF radiation. Alternatively, the radar may transmit a chirped radar signal toward the scene and interfere the back-scattered radiation with a copy of this chirped radar signal to produce a beat note whose frequency varies with the range to the target.

A side-looking airborne aperture radar (SLAR) is a radar that is used to image the ground from a moving platform, such as an aircraft or satellite. As the platform moves, the SLAR illuminates a swath of the ground at an angle, called the look or looking angle, with respect to the platform nadir. The SLAR signal hits the ground at a grazing angle, which is the angle with respect to the horizontal plane. The azimuthal resolution, also called the cross-range resolution, of a SLAR image depends on the ratio of the SLAR antenna diameter to the SLAR signal wavelength; the larger the antenna diameter, the finer the azimuthal resolution. In practice, the diameter of an antenna mounted on an aircraft or satellite is too small to produce an image with fine azimuthal resolution.

Synthetic aperture radar (SAR) is a variant of SLAR that provides finer azimuthal resolution. In SAR, the platform and radar together are used to emulate or synthesize a large phased-array radar with many emitting and receiving elements spanning a very large distance. Instead of having many elements at different spatial positions, like a phased-array radar, a SAR has a single element that is moved to different positions at different times by the platform. Together, these positions form a synthetic aperture large enough to provide much finer azimuthal resolution. SAR data can be used to produce 3D terrain maps.

Lidar is similar to radar but uses light instead of RF signals. A laser illuminates a scene with a lidar signal, which reflects and/or scatters off surfaces in the scene. A detector senses the scattered light, either directly or coherently, to produce a 3D point cloud representing the scene. Airborne lidars have been used for creating digital elevation models, digital terrain models, and other 3D representations with resolutions fine enough to resolve vegetation, man-made structures, and living things.

Unfortunately, radar, lidar, and passive 3D imaging techniques all suffer from drawbacks that limit their usefulness. Radar and lidar are both active devices and so tend to be expensive, bulky, heavy, and consume a lot of power. They are also susceptible to jamming and interference.

Passive imaging techniques based on feature-matching have also been used to create 3D images. In these techniques, a camera or other image sensor takes two-dimensional (2D) pictures of a scene from many different angles, which are then stitched together to form a 3D image using a feature-matching technique, such as the Scale Invariant Feature Transform (SIFT). These Structure from Motion (SfM) techniques involve matching features that can be uniquely identified, such as corners and edges, among images of the same scene taken from a wide variety of look angles. Using the knowledge of where common features appear in the focal plane, the features can then be located in physical space, and a 3D point cloud can be generated from the features' locations.

Passive methods based on feature matching rely on high-resolution imagery, a wide diversity of look angles, and the ability of SIFT or another feature-matching process to locate a large number of common features among all images. They are computationally very expensive and subject to robustness problems in the feature matching. Image reconstruction based on feature matching is highly sensitive to initial values and the ability of the feature detector to detect and match many high quality features. Another common robustness problem with feature-matching methods is that large numbers of photographs fail to register or misregister or drift, producing poor results. SfM techniques also have very high computational latencies because feature-matching can take many hours or even days to compute a solution, making a quick turnaround extremely challenging.

SUMMARY

The present technology generates 3D images with considerably lower size, weight, power consumption, and cost than active systems, like lidar or radar, or the computational expense and latency of Structure from Motion (SfM) techniques with passively acquired images. Instead, it generates 3D images in real time from spatial and temporal derivatives of full-motion video acquired with passive imaging sensor. More specifically, 3D imaging can be accomplished by acquiring full-motion video of a scene with an image sensor on a platform moving with respect to the scene while generating an estimate of a trajectory of the platform with respect to the scene, e.g., using a navigation unit or a priori information about the trajectory. A processor registers frames of the full-motion video to each other based on the estimate of the trajectory of the platform with respect to the scene. It also estimates a spatial gradient and a temporal derivative of the full-motion video. And it estimates a height map of the scene from the spatial gradient of the full-motion video and the temporal derivative of the full-motion video. The processor may also estimate a spatial resolution of the height map to be less than about 1 meter, create a 3D surface image from the height map, or both.

The platform may be an aircraft, in which case the image sensor can acquire the full-motion video of the scene while the aircraft is flying over the scene. Alternatively, the platform can be a satellite, in which case the image sensor can acquire the full-motion video of the scene while the satellite is in low Earth orbit.

The processor can register the frames of the full-motion video to each other and estimate the spatial gradient, temporal derivative, and height map in real time.

To register the frames of the full-motion video to each other based on the estimate of the trajectory of the platform with respect to the scene, the processor may estimate a projected angular velocity of the platform with respect to the scene. The processor may also cross-correlate successive frames in the full-motion video during registration.

Before estimating the spatial gradient or the temporal derivative of the full-motion video, the processor may map the frames of the full-motion video to coordinates of the scene.

The processor can estimate the height map by calculating a cost function $J(\vec{x})$:

$$J(\vec{x}) = \left\langle \sum_{t=0}^{T} \left| \frac{\partial I}{\partial t} + \tilde{h}(\vec{x})\vec{\Omega}(t) \cdot \nabla I(\vec{x}, t) \right|^2 \right\rangle,$$

where left and right angled brackets indicate an ensemble average, $\partial I/\partial t$ represents the temporal derivative of the full-motion video, $\tilde{h}(\vec{x})$ represents the height map, $\vec{\Omega}(t)$ represents a projected angular velocity of the platform with respect to the scene, and $\nabla I(\vec{x}, t)$ represents the spatial gradient of the full-motion video. In this case, the height map may have a Cramer-Rao lower bound $\sigma_h$ of:

$$\sigma_h = \frac{1}{2\pi \left|\vec{\Omega}(t)\right| \gamma} \frac{\Delta x}{\Delta t} \sqrt{\frac{3 P_f \Delta t}{T}},$$

where $\Delta x$ represents a scene coordinate sampling distance of the full-motion video, $\Delta t$ represents a frame time of the full-motion video, T represents a duration of the full-motion video, $\gamma$ represents a texture-to-noise ratio of the full-motion video, and $P_f$ represents a total energy of the ensemble average.

Alternatively, 3D images can be generated by acquiring full-motion video of a scene from a camera on a platform moving with respect to the scene while generating an estimate of a trajectory of the platform with respect to the scene. A processor registers frames of the full-motion video to each other based on the estimate of the trajectory of the platform with respect to the scene. The processor also estimates (i) a projected angular velocity of the platform based on the estimate of the trajectory of the platform with respect to the scene and (ii) a texture of the full-motion video. The processor uses the projected angular velocity of the platform and the texture of the full-motion video to estimate a height map of the scene.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Imaging a three-dimensional (3D) scene is a very useful for applications range disaster recovery to battlefield situational. The technology disclosed here exploits the parallax of a 3D scene using a constrained variation of the Lucas-Kanade solution to the optical flow equations to extract the elevation of the imaged scene from full-motion video (FMV) acquired by an Electro-Optical or Infrared (EO/IR) imager. This technology can achieve sub-meter resolution using practical commercial off-the-shelf (COTS) sensors in near real-time as demonstrated with data collected from an airborne EO/IR sensor.

Compared to lidar and radar, the present technology is simpler and less expensive to implement and less susceptible to jamming. In addition, a digital EO/IR camera occupies significantly less space, consumes less power, weighs less, and costs much less than a lidar or radar with comparable performance, so the present technology is much easier to engineer and deploy. And like other passive imaging techniques, the present technology is stealthier than radar, lidar, and other active imaging techniques.

Inventive 3D imaging methods also offer improvements over passive 3D imaging using feature matching. The present 3D imaging technology do not rely on feature matching. Instead, they use the texture of the imagery relative to the sensor noise level to estimate a height map of the scene. Because they do not require feature matching, the inventive 3D imaging methods are not subject to the robustness and ambiguity problems that plague feature-matching methods of 3D imaging. Computationally, the inventive 3D imaging methods are not very expensive and can even be implemented in real-time or near real-time to enable tactical wide-area 3D imaging missions. They are well-suited for persistent 3D imaging from aircraft and satellites and for on-demand 3D imaging from rapidly deployable aircraft.

The present technology is also well-suited for generating 3D images from data captured with Low Earth Orbiting (LEO) satellites, which enables persistent global coverage and rapid response. The ability to collect data and generate accurate elevation maps from a LEO satellite is a major advantage because it enables a response within about 90 minutes, which is about the time it takes a LEO satellite to complete one revolution around the Earth. An inventive 3D imaging system can collect data almost anywhere on the Earth's surface within hours when deployed on a suitable aircraft, such as an airplane, unmanned aerial vehicle (UAV), or lighter-than-air (LTA) vehicle. A passive 3D imaging system deployed on UAV or LTA vehicle could monitor an area for hours or days at a time, e.g., in support of disaster relief or security operations.

In particular, the inventive 3D imaging technology can be used for disaster assessment and recovery. Elevation maps produced using 3D mapping techniques were used to locate debris fields resulting from Hurricane Irma and to estimate the size and volume of that debris in order to properly deploy recovery teams. Another related application is damage assessment such as detection of destroyed buildings and other structures. The utility of damage assessment from 3D imaging data has been demonstrated in the aftermaths of the 2010 Haiti earthquake; the 2011 Joplin, Mo. tornado; and Hurricane Irene.

Passive 3D imaging can also be to acquire accurate elevation maps for agricultural, intelligence, and security. For example, passive 3D imaging could be used to monitor the growth of crops or changes in snow cap or water levels. It could also be used to create high-resolution maps for geological or topographic surveys, urban planning, and logistics. Using the inventive techniques, data could be updated from LEO satellite imagery with a high degree of accuracy. And because the inventive techniques accurately and robustly map the elevation of urban environments using a very small number of frames in near-real time, they can be used to generate high quality 3D imagery for products like Google Earth.

An Example Passive 3D Imaging System

Figure 1:
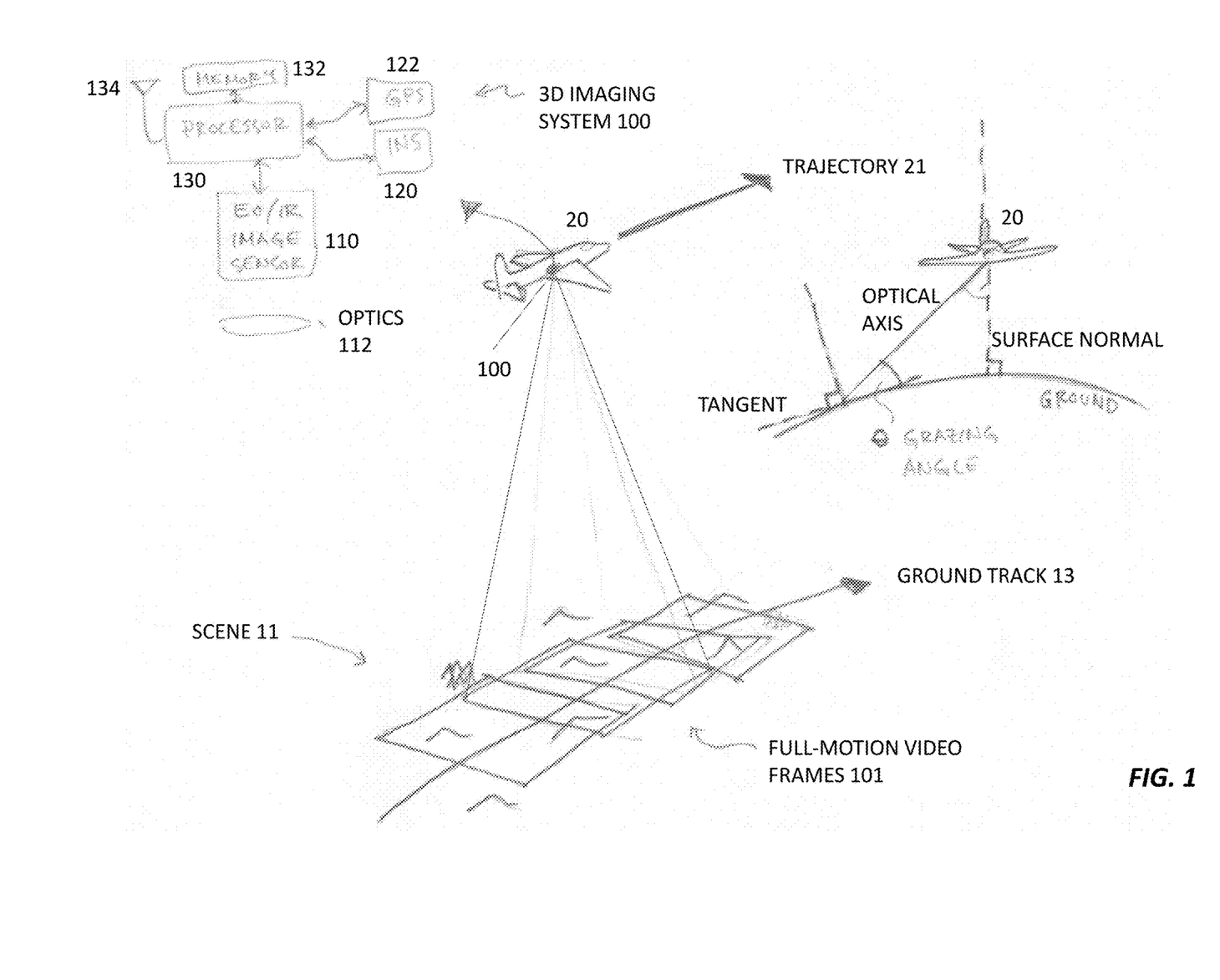
FIG. 1 illustrates a 3D passive imaging system that generates 3D images from full-motion video acquired from a moving platform (here, an airplane).

FIG. 1 shows a passive 3D imaging system 100 mounted on a platform—here, an airplane 20—that moves relative to the ground. The passive 3D imaging system 100 can mounted in a payload bay or from the wing, nose, or tail of the airplane 20. As shown at left in FIG. 1, the passive 3D imaging system 100 includes a processor 130 that is operably coupled to an EO/IR image sensor 110; a relative positioning system, such as an inertial measurement unit (IMU) or inertial navigation system (INS) 120; an absolute positioning system, such as a global positioning system (GPS) receiver 122 or other global navigation satellite system (GNSS) receiver; a memory 132; and an optional wireless transceiver 134. The INS 120 and GPS receiver 122 can be integral to the passive imaging system 100, integral to the airplane 20, or separate components that are simply communicatively coupled to the processor 130.

The electronic components, including the processor 130 and memory 132, can be arranged anywhere convenient in or on the airplane 20. The EO/IR image sensor 110, on the other hand, is arranged to receive light via imaging optics 112, such as a telescope, that points directly downward or to the side of the aircraft 20. The EO/IR image sensor 110 can operate in any suitable wavelength band, including in the visible and/or near-infrared regions of the electromagnetic spectrum.

As the airplane 20 flies along its trajectory 21, the image sensor 110 acquires full-motion video frames 101 of a swath of the ground, called the scene 11, below or to the side of the airplane's trajectory 21. The image sensor 110 operates at a frame rate of 1 Hz to 10 Hz or more, which is fast enough to ensure that successive images overlap enough to be cross-correlated for registration and mapping. These full-motion video frames 101 follow a ground track 13, which is a projection of the airplane's trajectory 13 onto the ground.

As shown at right in FIG. 1, for a side-looking image system, the angle formed between the optical axis of the optics 112 and the tangent to the ground at the intersection between the optical axis and the ground is called the grazing angle $\theta$. The look or looking angle $\phi$ is the angle between the scene center and the velocity vector of the airplane 20. If the scene center is right in front of the airplane 20, the look angle is 0 degrees. If the scene center is on the port side of the airplane 20, then the look angle is 90 degrees. For nadir-pointed optics 112 (as opposed to side-looking optics 112), the look angle is defined to be zero. Each pixel in the focal plane has a slightly different grazing angle and look angle, and at most only one pixel points straight down, even for nadir-pointing optics 112.

The processor 130 formats and stores representations of the full-motion video frames 101 in the memory 132 along with meta data about the frames, including a time stamp for each frame. The processor 130 also stores absolute and relative position data from the GPS receiver 122 and INS 120, respectively, along with time stamps for that data. The processor 130 may use the full-motion video frames 101, time stamps, and relative and absolute position data to generate 3D images in real-time or near-real-time and send those 3D images to a receiver on the ground or elsewhere via the wireless transceiver 134. It can also send the raw full-motion video frames 101, time stamps, and relative and absolute position data to the receiver for generation of the 3D images.

Imaging a three-dimensional (3D) scene is a very useful and interesting technology to both civilian and military customers. Applications range from disaster recovery to battlefield situational awareness. The technology disclosed here exploits the parallax of a 3D scene using a constrained variation of the Lucas-Kanade solution to the optical flow equations to extract the elevation of the imaged scene from full-motion video (FMV) Electro-Optical or Infrared (EO/IR) data. This technology can achieve sub-meter resolution using practical commercial off-the-shelf (COTS) sensors in near real-time. This performance has been demonstrated with data collected from an airborne sensor. The present technology is also well-suited for data captured with Low Earth Orbiting (LEO) satellites, which enables persistent global coverage and rapid response. The passive nature of the processing techniques also significantly reduces the size weight and power (SWaP) as well as the cost of implementation and deployment compared to active RADAR and LIDAR systems with similar performance.

Passive 3D imaging can also be performed in an inverse sense, with the camera mounted on a stationary platform and configured to image a scene that moves past that stationary platform. Inverse passive 3D imaging is roughly analogous to inverse synthetic aperture radar. The stationary camera images moving objects, such as parts on a conveyor belt or assembly line, from different angles as the objects move past the stationary camera. Alternatively, a scanner, such as a moving mirror, may scan the field of view of a stationary camera to produce an image with a wider field of view (e.g., a panoramic image). In each of these cases, the reference coordinate system moves instead of the platform and camera. To compensate, the frames of the full-motion video are registered to the reference coordinates—for example, images of objects on a conveyor belt may be registered to the conveyor belt using prior knowledge or measurements of the conveyor belt's velocity so that the objects appear stationary in the full-motion video. The registered images can then be used to generate height maps of the objects as described below.

Transforming Full-Motion Video into 3D Images

An image $I_0(\vec{x})$, such as a frame of full-motion video, that has an elevation map $h(\vec{x})$ appears distorted when mapped to a flat plane in the following way:

$$I(\vec{x}, t) = I_0(\vec{x} - \delta \vec{r}[\vec{x}, t]) \quad (1)$$

where I represents the distorted mapped image and $$\delta \vec{r} = [\cos(\phi) \sin(\phi)]^T \cot(\theta) h(\vec{x})$$

is called the displacement vector. Here, $\phi$ represents the look angle with respect to the ground coordinates and $\theta$ is the grazing angle as shown in FIG. 1. An instant $\Delta t$ later e.g., in the next frame of a full-motion video with a frame rate of $1/\Delta t$—there is a slightly different distortion field due to parallax resulting from the elevation map $$I(\vec{x}, t+\Delta t) = I_0(\vec{x} - \delta \vec{r}[\vec{x}, t+\Delta t]) \quad (2)$$

Subtracting Equation (1) from Equation (2) makes it possible to relate the temporal derivative of I to the spatial derivative of I:

$$\frac{\partial I}{\partial t} = -\delta \dot{\vec{r}}[\vec{x}, t] \cdot \nabla I \quad (3)$$

The time derivative of the displacement vector is $$\delta \dot{\vec{r}}[\vec{x}, t] = \left( \dot{\phi} \begin{bmatrix} -\sin(\phi) \\ \cos(\phi) \end{bmatrix} \cot(\theta) - \dot{\theta} \begin{bmatrix} \cos(\phi) \\ \sin(\phi) \end{bmatrix} \csc^2(\theta) \right) h(\vec{x}). \quad (4)$$

If the projected angular velocity vector is defined as $$\vec{\Omega} \equiv \dot{\phi} \begin{bmatrix} -\sin(\phi) \\ \cos(\phi) \end{bmatrix} \cot(\theta) - \dot{\theta} \begin{bmatrix} \cos(\phi) \\ \sin(\phi) \end{bmatrix} \csc^2(\theta)$$

then Equation (3) can be written as $$\frac{\partial I}{\partial t} = -h(\vec{x}) \vec{\Omega}(t) \cdot \nabla I(\vec{x}, t) \quad (5)$$

Intuitively, the projected angular velocity vector can be interpreted as the rate at which the imager rotates around a spot on the ground located at $\vec{x}$. From Equation (5), an image with high texture, $|\nabla I|$, produces large frame-to-frame changes in a full-motion video, even for objects with small heights. The effect is magnified for large values of $|\Omega|$, making the following process suitable for low-flying airbreathers and LEO satellites.

For a full-motion video of a given scene, mapped and registered to ground coordinates sampled at $\Delta \vec{x}$, for T seconds at a frame time of $\Delta t$, the height map $\tilde{h}(\vec{x})$ of the scene can be estimated by minimizing the cost function J $$J(\vec{x}) = \langle \sum_{t=0}^{T} \left| \frac{\partial I}{\partial t} + \tilde{h}(\vec{x}) \vec{\Omega}(t) \cdot \nabla I(\vec{x}, t) \right|^2 \rangle \quad (6)$$

where left and right angled brackets indicate an ensemble average. The solution to the minimization problem in Equation (6) is $$\tilde{h}(\vec{x}) = - \frac{\langle \sum_{t=0}^{T} \dot{I}(\vec{x}, t)[\vec{\Omega}(t) \cdot \nabla I(\vec{x}, t)] \rangle}{\langle \sum_{t=0}^{T} [\vec{\Omega}(t) \cdot \nabla I(\vec{x}, t)]^2 \rangle} \quad (7)$$

The temporal derivative can be approximated with a central difference $$\dot{I}(\vec{x}, t) = \frac{I(\vec{x}, t+\Delta t) - I(\vec{x}, t-\Delta t)}{2\Delta t} \quad (8)$$

and the spatial gradient can be expressed in terms of the Fourier Transform $$\nabla I(\vec{x}, t) = \int i \vec{k} \tilde{I}(\vec{k}, t) e^{i \vec{k} \cdot \vec{x}} d\vec{k} \quad (9)$$

Figure 2:
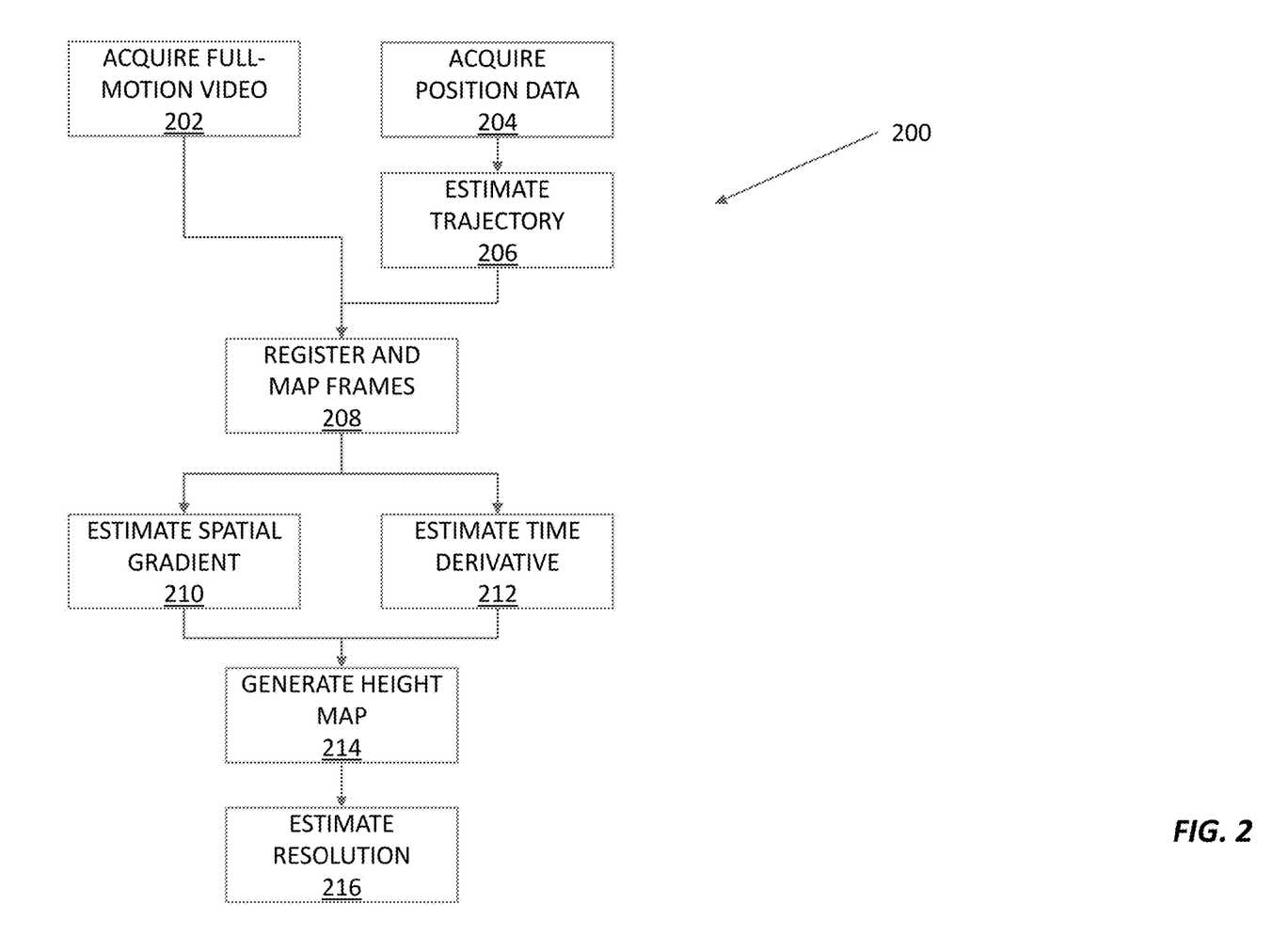
FIG. 2 is a flow chart showing a process of generating 3D images from full-motion video acquired from a moving platform.

FIG. 2 illustrates a process 200 of generating 3D images from full-motion video according to the relationships in Equations (1) through (9). In this process 200, an EO/IR camera or other image sensor acquires full-motion video of the ground or another scene from a moving platform, such as an aircraft or spacecraft, for T seconds at a frame time of $\Delta t$ (e.g., 1 second, 100 milliseconds, or less), as explained above (202). At the same time, a navigation unit, such as a GPS receiver and/or an IMU, records data about the moving platform's absolute and/or relative position (204). A processor on the moving platform or the ground estimates the trajectory of the moving platform from the absolute and/or relative position data (206). If the image sensor is fixed with respect to the moving platform, then the image sensor follows the same trajectory, albeit with a potential offset to account for any distance between the image sensor's center of mass and the position(s) of the GPS receiver and/or IMU as well as any orientational differences.

Next, the processor registers the frames of the full-motion video to each other by cross-correlating chips of adjacent frames and fitting the correlation vectors to a low-order polynomial. The registered frames are then mapped to the coordinates of the scene (ground) based at least in part on the estimated trajectory (208). The processor calculates the spatial and temporal derivatives of the mapped, registered frames (210, 212) and uses those derivates to estimate a height map of the scene (214), which can be used to generate a 3D surface. It may estimate the height map by minimizing the cost function in Equation (6) (above); it may also estimate the height map's spatial resolution (216), which can be less than one meter (e.g., 25 cm, 10 cm, 5 cm, or less) and relates to the processed noise, described below. (Alternatively, the processor can estimate the height map from estimates of the texture of the registered, mapped full-motion video frames and the platform's projected angular velocity, which can be derived from the platform's estimated trajectory.)

Cramer Rao Lower Bound

If the passive imaging system is shot noise limited, the resolution of the height map can be derived in terms of the uncertainty in the processed noise. If the full-motion video image frames, M, are modeled as $$M(\vec{x}, t) = I(\vec{x}, t) + n(\vec{x}, t) \quad (10)$$

the Cramer Rao Lower Bound (CRLB) is $$\sigma_h = \Delta h = \frac{1}{2\pi |\Omega| \gamma} \frac{\Delta x}{\Delta t} \sqrt{\frac{3 P_f \Delta t}{T}} \quad (11)$$

where $\sigma_h$ is the standard deviation of the processed noise in meters and $\gamma$ is defined as the Texture-to-Noise Ratio (TNR) of the image:

$$\gamma^2 \equiv \frac{|\nabla I|^2}{\sigma_x^2} \quad (12)$$

$$\sigma_x^2 \equiv E\{|\nabla n^2|\} = \frac{\pi^2 \sigma^2}{3 \Delta x^2} \quad (13)$$

The TNR of an image depends both on the resolution of the sensor and the scene itself. From analyzed imagery, typical TNR values for a sensor with 2-meter ground sample distance (GSD) are in the neighborhood of 20 dB.

The term $P_f$ in Equation (11) represents the total energy of the filter used in the ensemble average. A filter with large support space may have a small $P_f$, but may also have the effect of a low-pass filter on the elevation map. For large-scale elevation maps, a large support space can be used to make the resolution coarser. If small-scale features are of interest, a small support space makes the resolution finer but may degrade the resolution of the height field.

Experimental Demonstration

An inventive passive 3D imaging technology was used to generate height maps from full-motion video collected from a Cessna flying at an altitude of about 5000 feet. The raw imagery were acquired using a 4.5 mm F-2 lens and a 1 Mpix panchromatic detector focal plane array (FPA). The absolute position and attitude of the sensor were simultaneously collected using a dGPS and IMU. The sensor GSD was approximately 2 meters at this altitude, and frames were collected at a frame rate of 8 Hz, with the image sensor pointing at nadir. The average projected angular velocity in $|\Omega|$ over the total field of view was approximately 3 deg/sec.

Figure 3A:
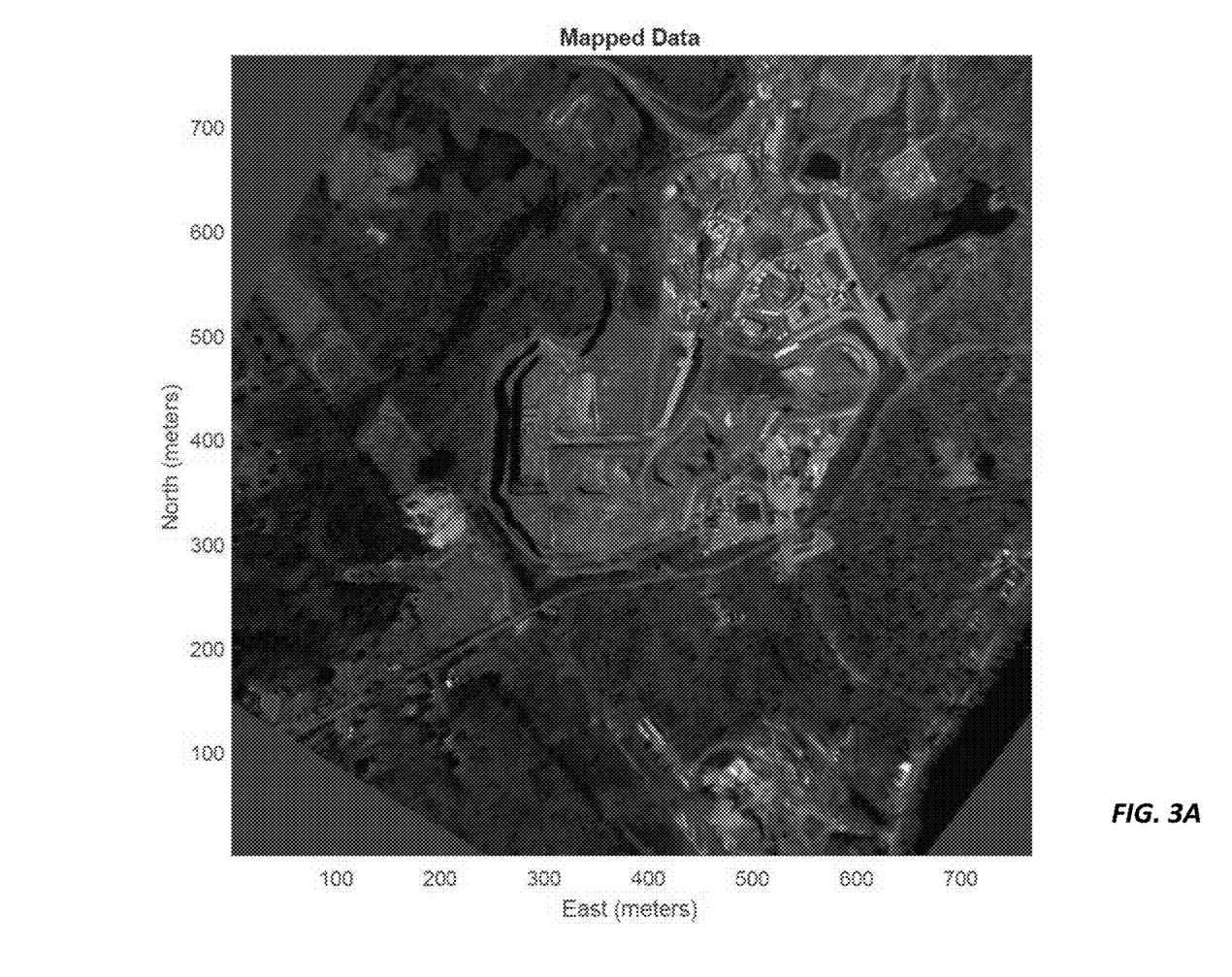
FIG. 3A shows a mapped contrast data of a quarry located at 42.6734 Latitude, −71.2483 Longitude
Figure 3B:
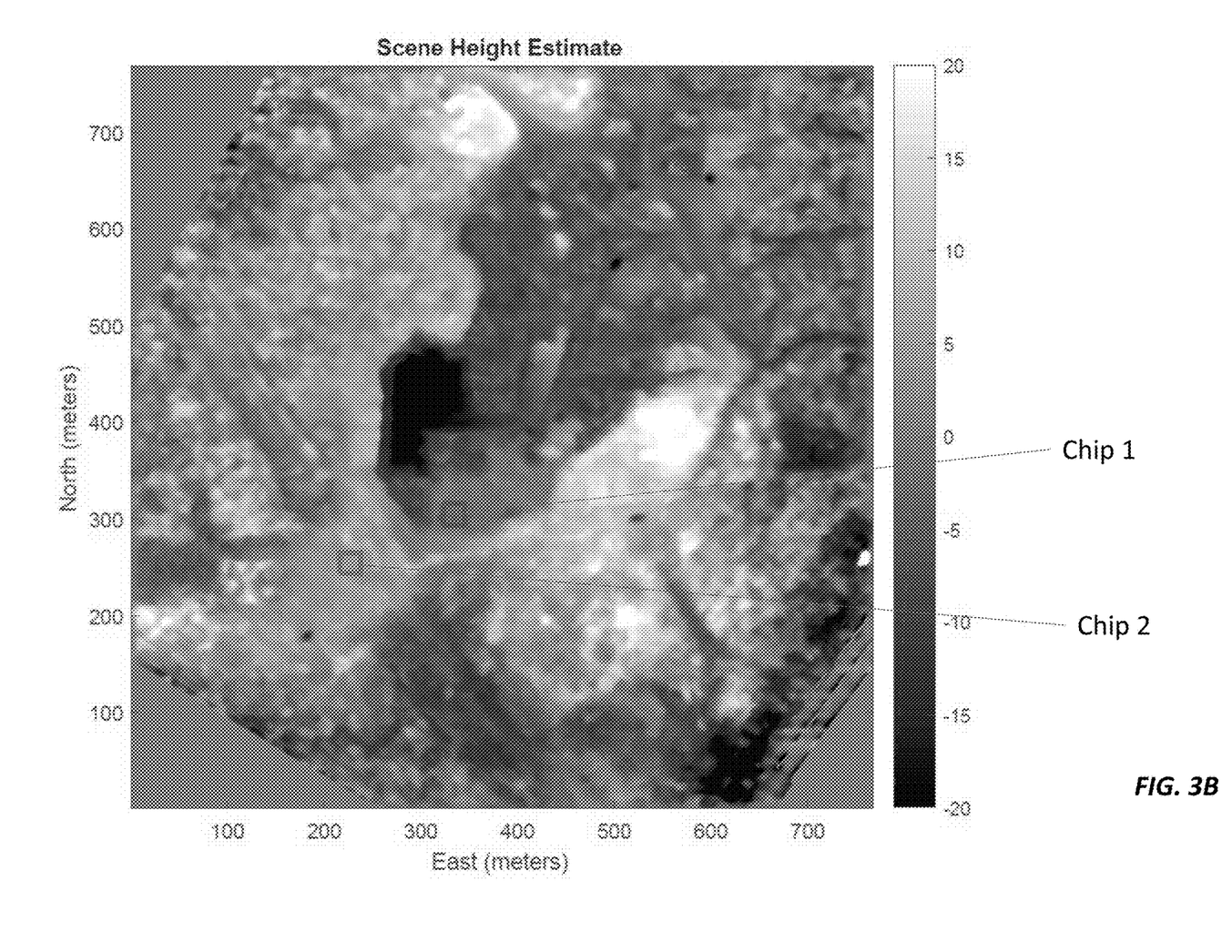
FIG. 3B shows a height map of the quarry of FIG. 3A generated from full-motion video using the process shown in FIG. 2.
Figure 4:
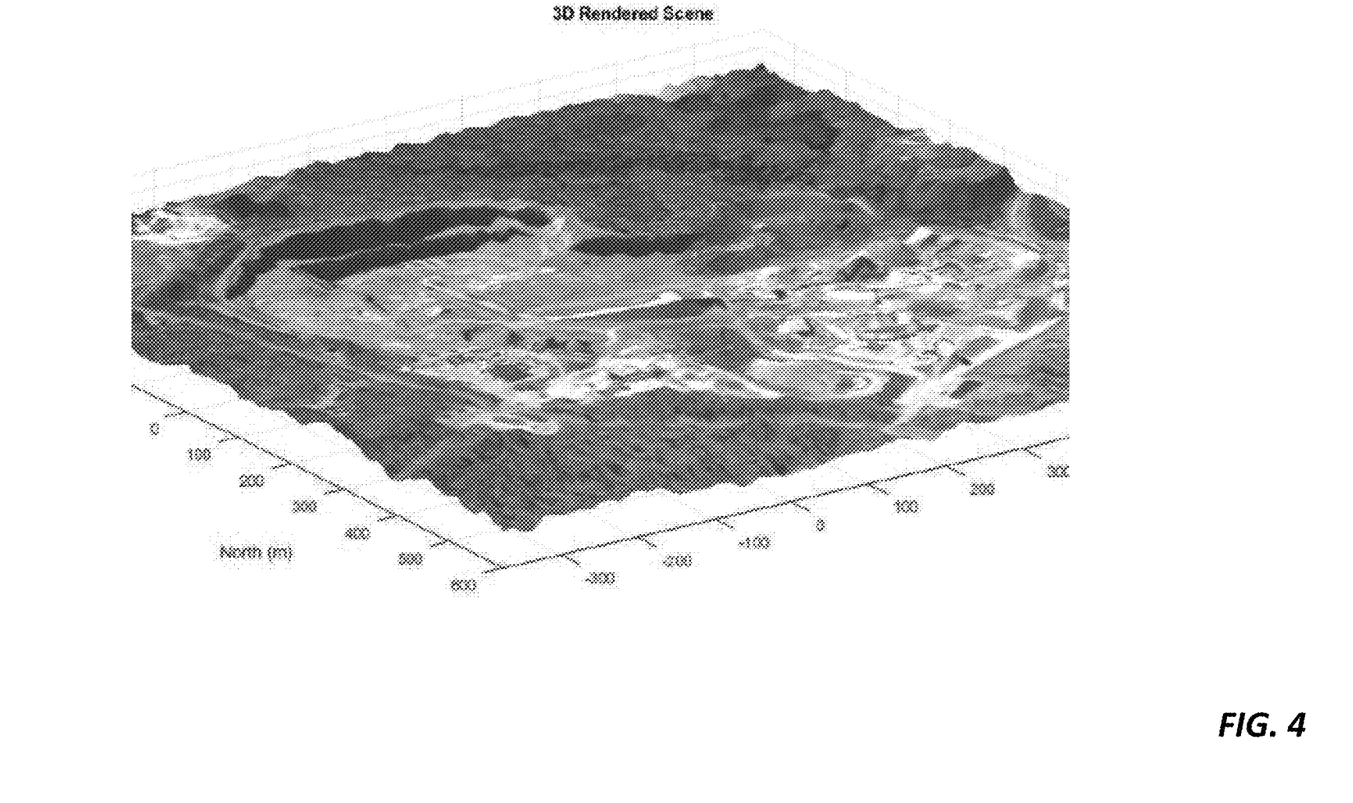
FIG. 4 is a 3D rendering of the quarry.

FIGS. 3A and 3B show the raw image sensor data and a corresponding height estimate mapped to East-North-Up coordinates. The raw image in FIG. 3A shows a single frame, whereas the corresponding height estimate in FIG. 3B was generated from processing 40 consecutive frames of data (5 seconds real time). The images and height estimate are of a quarry located at 42.6734 Latitude, −71.2483 Longitude. Using the estimated height field, the 3D scene can be rendered crudely using Matlab's surf function, as shown in FIG. 4. Chips 1 and 2 are levels of flat ground in the quarry for characterization of the height estimate (see FIG. 6).

Figure 5:
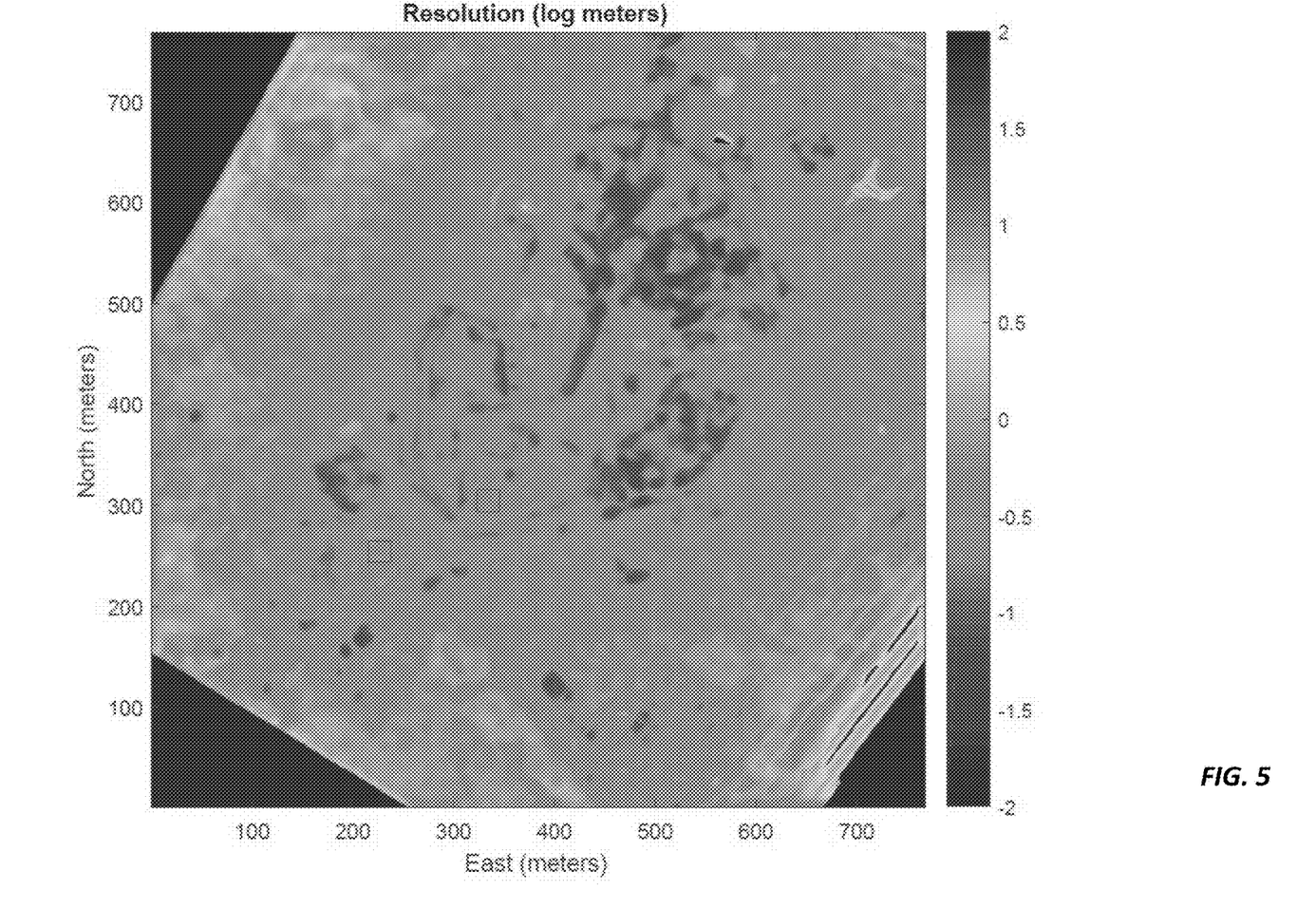
FIG. 5 shows the 1-σ uncertainty of the height estimate in FIG. 5A.

FIG. 5 shows the estimated 1-σ uncertainty of the height estimate in FIG. 3B. The units of FIG. 5 are log meters with the scale bar at right showing the shading corresponding to the uncertainty (resolution). A shading that falls within the range of −1 to −2 on the scale base is between 10 cm and 1 cm, meaning that the height estimate at that location is accurate to within 1-10 centimeters. This uncertainty, also defined as the resolution of the height field, is generally less than 20 cm.

Figure 6:
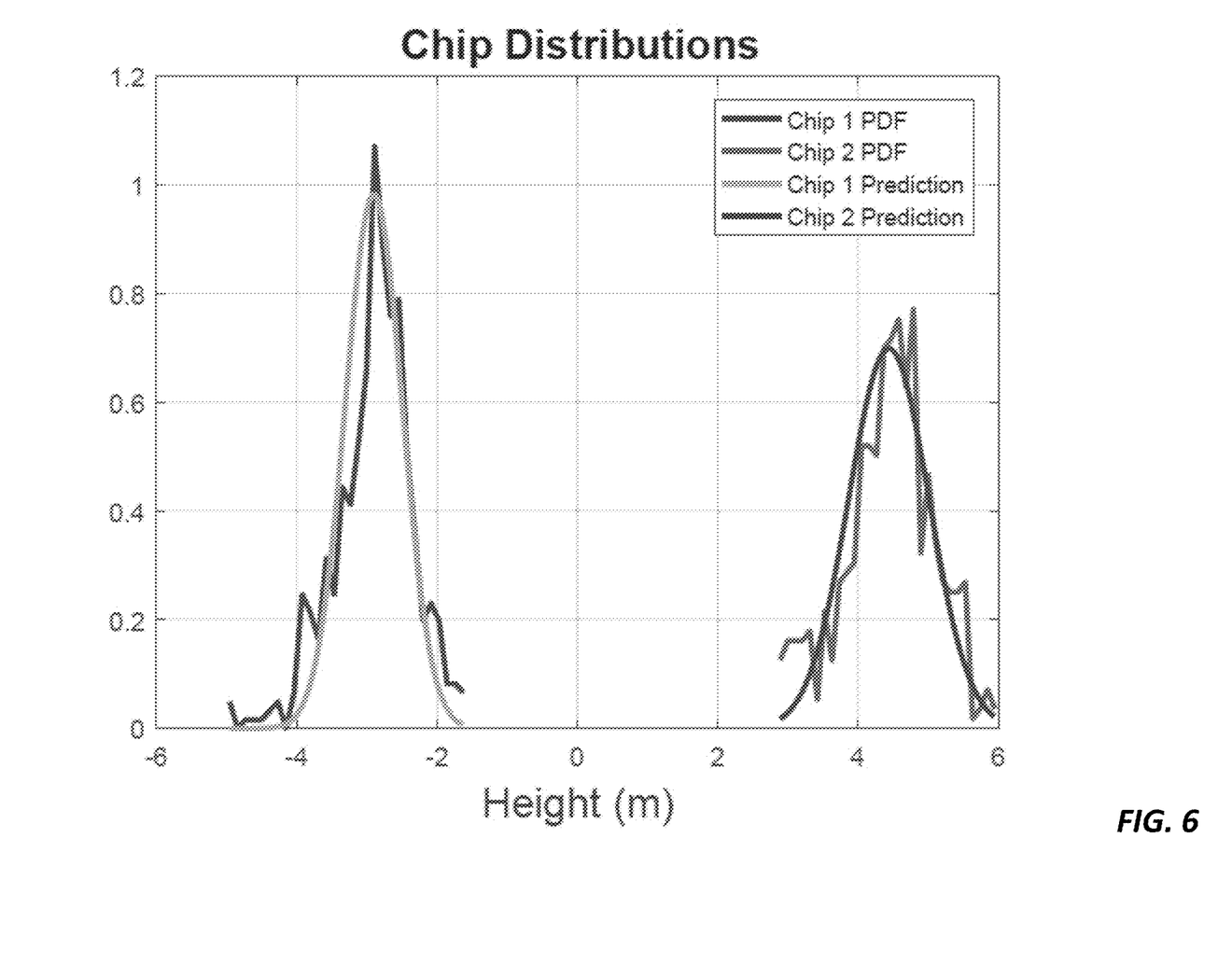
FIG. 6 shows measured and predicted height distributions for two different sections of the height estimate in FIG. 3B.

FIG. 6 illustrates a comparison of the present 3D imaging technique to other techniques. It shows histograms of the measured and predicted height estimates within two boxes, or chips, surrounding levels of flat ground in the height map of FIG. 3B. The predicted height estimate distributions are based on image texture and shot noise levels. The predicted and measured resolutions for chip 1 are 0.40 meters and 0.55 meters, respectively. The predicted and measured resolutions for chip 2 are 0.57 meters and 0.64 meters, respectively. For both chips, the predict and measured resolutions are within 15 cm of each other. And the difference in the means of the distributions is 7.33 meters, which is comparable to the 7.62-meter average difference in elevation for the corresponding points according to the United States Geological Survey. The difference in elevation between the two levels of the quarry is comparable to what is reported by Google Earth, which has data reported in increments of 1 ft.

Computational Cost

The estimated height map of the quarry was processed using 5 seconds of flight data, corresponding to 40 raw frames on an Intel Xeon 2.60 GHz CPU with 64 GB of RAM using Matlab. The patch size was 768×768 pixels. By using the Matlab tic/toc function, the total processing time was 18 seconds of wall time, which corresponds to about 3.6 times real time. With faster hardware, programming in a lower-level language (e.g., C or C++), and making registration and mapping with parallel routines, the passive 3D image processing can be accomplished in real time or near-real time.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of three-dimensional (3D) imaging, the method comprising:
   acquiring full-motion video of a scene from a platform moving with respect to the scene while generating an estimate of a trajectory of the platform with respect to the scene;
   registering frames of the full-motion video to each other based on the estimate of the trajectory of the platform with respect to the scene;
   estimating a spatial gradient of the full-motion video;
   estimating a temporal derivative of the full-motion video; and
   estimating a height map of the scene from the spatial gradient of the full-motion video and the temporal derivative of the full-motion video.

2. The method of claim 1, wherein the platform is an aircraft and wherein acquiring the full-motion video of the scene occurs while the aircraft is flying over the scene.

3. The method of claim 1, wherein the platform is a satellite and wherein acquiring the full-motion video of the scene occurs while the satellite is in low Earth orbit.

4. The method of claim 1, wherein registering frames of the full-motion video to each other, estimating the spatial gradient of the full-motion video, estimating the temporal derivative of the full-motion video, and estimating the height map occurs in real time.

5. The method of claim 1, wherein registering the frames of the full-motion video to each other based on the estimate of the trajectory of the platform with respect to the scene comprises estimating a projected angular velocity of the platform with respect to the scene.

6. The method of claim 1, further comprising, before estimating the spatial gradient of the full-motion video or the temporal derivative of the full-motion video:
   mapping the frames of the full-motion video to coordinates of the scene.

7. The method of claim 1, wherein estimating the height map comprises calculating a cost function $J(\vec{x})$:

$$J(\vec{x}) = \langle \sum_{t=0}^{T} \left| \frac{\partial I}{\partial t} + \tilde{h}(\vec{x})\vec{\Omega}(t) \cdot \nabla I(\vec{x}, t) \right|^2 \rangle,$$

where left and right angled brackets indicate an ensemble average, $\partial I/\partial t$ represents the temporal derivative of the full-motion video, $\tilde{h}(\vec{x})$ represents the height map, $\vec{\Omega}(t)$ represents a projected angular velocity of the platform with respect to the scene, and $\nabla I(\vec{x}, t)$ represents the spatial gradient of the full-motion video.

8. The method of claim 7, wherein the height map has a Cramer-Rao lower bound $\alpha_h$ of:

$$\sigma_h = \frac{1}{2\pi |\vec{\Omega}(t)| \gamma} \frac{\Delta x}{\Delta t} \sqrt{\frac{3 P_f \Delta t}{T}},$$

where $\Delta x$ represents a scene coordinate sampling distance of the full-motion video, $\Delta t$ represents a frame time of the full-motion video, T represents a duration of the full-motion video, γ represents a texture-to-noise ratio of the full-motion video, and $P_f$ represents a total energy of the ensemble average.

9. The method of claim 1, further comprising:
estimating a spatial resolution of the height map to be less than about 1 meter.

10. A system for three-dimensional (3D) imaging, the system comprising:
an image sensor to acquire full-motion video of a scene from a platform moving with respect to the scene;
a navigation unit to generate an estimate of a trajectory of the platform with respect to the scene; and
a processor, operably coupled to the image sensor and the navigation unit, to:
register frames of the full-motion video to each other based on the estimate of the trajectory of the platform with respect to the scene;
estimate a spatial gradient of the full-motion video;
estimate a temporal derivative of the full-motion video; and
estimate a height map of the scene from the spatial gradient of the full-motion video and the temporal derivative of the full-motion video.

11. The system of claim 10, wherein the image sensor is an electro-optical/infrared (EO/IR) image sensor.

12. The system of claim 10, wherein the platform is an aircraft and the image sensor is configured to acquire the full-motion video of the scene while the aircraft is flying over the scene.

13. The system of claim 10, wherein the platform is a satellite and the image sensor is configured to acquire the full-motion video of the scene while the satellite is in low Earth orbit.

14. The system of claim 10, wherein the processor is configured to register the frames of the full-motion video to each other, estimate the spatial gradient of the full-motion video, estimate the temporal derivative of the full-motion video, and estimate the height map in real time.

15. The system of claim 10, wherein processor is configured to estimate a projected angular velocity of the platform with respect to the scene based on the estimate of the trajectory of the platform with respect to the scene.

16. The system of claim 10, wherein processor is configured to map the frames of the full-motion video to coordinates of the scene before estimating the spatial gradient of the full-motion video or the temporal derivative of the full-motion video.

17. The system of claim 10, wherein processor is configured to estimate the height map by calculating a cost function $J(\vec{x})$:

$$J(\vec{x}) = \langle \sum_{t=0}^{T} \left| \frac{\partial I}{\partial t} + \tilde{h}(\vec{x})\vec{\Omega}(t) \cdot \nabla I(\vec{x}, t) \right|^2 \rangle,$$

where left and right angled brackets indicate an ensemble average, $\partial I/\partial t$ represents the temporal derivative of the full-motion video, $\tilde{h}(\vec{x})$ represents the height map, $\vec{\Omega}(t)$ represents a projected angular velocity of the platform with respect to the scene, and $\nabla I(\vec{x}, t)$ represents the spatial gradient of the full-motion video.

18. The system of claim 17, wherein the height map has a Cramer-Rao lower bound $\alpha_h$ of:

$$\sigma_h = \frac{1}{2\pi |\vec{\Omega}(t)| \gamma} \frac{\Delta x}{\Delta t} \sqrt{\frac{3P_f \Delta t}{T}},$$

where $\Delta x$ represents a scene coordinate sampling distance of the full-motion video, $\Delta t$ represents a frame time of the full-motion video, T represents a duration of the full-motion video, γ represents a texture-to-noise ratio of the full-motion video, and $P_f$ represents a total energy of the ensemble average.

19. The system of claim 10, wherein the height map has a spatial resolution of less than about 1 meter.

20. A method of three-dimensional (3D) imaging, the method comprising:
acquiring full-motion video of a scene from a platform moving with respect to the scene while generating an estimate of a trajectory of the platform with respect to the scene;
registering frames of the full-motion video to each other based on the estimate of the trajectory of the platform with respect to the scene;
estimating a projected angular velocity of the platform based on the estimate of the trajectory of the platform with respect to the scene;
estimating a texture of the full-motion video; and
estimating a height map of the scene based on the projected angular velocity of the platform and the texture of the full-motion video.

* * * * *

UNITED STATES PATENT AND TRADEMARK OFFICE
CERTIFICATE OF CORRECTION

| | |
|---|---|
| PATENT NO. | : 11,580,694 B1 |
| APPLICATION NO. | : 17/005410 |
| DATED | : February 14, 2023 |
| INVENTOR(S) | : Robert Sweeney |

It is certified that error appears in the above-identified patent and that said Letters Patent is hereby corrected as shown below:

In the Claims

• In Column 12, Claim 8, Line 58, replace "Cramer-Rao lower bound α_h" with – Cramer-Rao lower bound σ_h –

• In Column 14, Claim 18, Line 17, replace "Cramer-Rao lower bound α_h" with – Cramer-Rao lower bound σ_h –

Signed and Sealed this
Eighth Day of August, 2023

Katherine Kelly Vidal
*Director of the United States Patent and Trademark Office*